United States Patent Office 3,383,232
Patented May 14, 1968

3,383,232
PROCESS FOR PRODUCING FURNACE
BLACK PIGMENTS
Merrill E. Jordan, Walpole, Hugh J. Deery, Jamaica Plain, Erivan Hagopian, Newton, and Frank R. Williams, Quincy, Mass., assignors to Cabot Corporation, Boston, Mass., a corporation of Delaware
No Drawing. Continuation-in-part of application Ser. No. 380,679, July 6, 1964. This application Jan. 10, 1966, Ser. No. 519,532
6 Claims. (Cl. 106—307)

ABSTRACT OF THE DISCLOSURE

According to the invention there is disclosed a process for treating certain furnace carbon blacks to produce improved ink grade carbon black pigments, in fluffy form, characterized by having excellent flow properties and a high degree of dispersibility on conventional ink making equipment, said process comprising the steps of treating said furnace blacks with an oxidizing agent more active than molecular oxygen to increase the volatile content of said blacks substantially and then subjecting the so-oxidized blacks to fluid energy attrition.

---

This invention relates to carbon black and is a continuation-in-part of U.S. Ser. No. 380,679, filed July 6, 1964, now abandoned. More precisely, the invention disclosed herein relates to an improved process for producing carbon black pigments for ink systems, especially lithographic ink systems and the like in which carbon black pigments are present in high concentrations.

A continuing problem in the carbon black industry is to provide a suitable carbon black pigment to the ink industry. The most complicating factors inherent in this problem are two: (a) the specialized properties required of the pigment and (b) the physical state in which said pigment is supplied to the ink manufacturer. In general, the most desirable ink pigments are characterized by long flow properties, high jetness or masstone and high tinctorial power. Also since the shear forces most generally utilized in dispersing ink pigments into the proper vehicle are relatively mild, dispersibility is a significant factor. Thus in order to achieve a good dispersion efficiently in existing equipment, the ink manufacturer requires that the pigment be supplied in as fluffy a form as practicable.

For many years, channel blacks were used almost exclusively in printing inks. Such blacks were eminently qualified for such an application because in the fluffy form they were readily dispersible and inherently possessed such properties as low particle diameter—hence excellent tintorial power—and high volatile contents which contribute to excellent flow characteristics. However, the increasing cost of channel blacks has caused the ink industry in many instances to adopt furnace blacks as substitutes therefor. Today for example, it is estimated that at least about 60% of all news and heatset inks contain furnace blacks as pigments and in such applications furnace black pigments have generally proved to be entirely satisfactory.

However, the use of furnace blacks as pigments in offset or lithographic inks has left much to be desired. Such inks must possess maximum tinting strength and covering power and thus high loadings of black are normally utilized with amounts up to 20–25% by weight carbon black not being uncommon. At such high concentrations, the flow characteristics of the black are of extreme if not paramount importance. Although there are many known treatments for improving flow characteristics of furnace blacks, the manipulative steps involved therein are generally such that the application of such treatments to furnace blacks usually adversely affects the dispersibility of the ultimate pigment. Thus, the use of a so treated furnace black pigment requires a greater expenditure of energy in order to achieve the stringently high degree of dispersion required in offset or lithographic inks. Accordingly, there is an urgent need in the art for a process which will consistently provide an improved, readily dispersible furnace black pigment in fluffy form which is especially suitable for use in high concentrations in ink vehicles.

A principal object of the present invention is to provide an improved carbon black pigment.

A more specific object of the present invention is to provide an improved process for producing a furnace black in fluffy form having excellent flow properties and tinting strength together with a high degree of dispersibility which properties especially recommend the black for utility as a pigment in ink vehicles.

Another specific object is to provide an improved process for producing a furnace black pigment which can advantageously be used in high concentrations in those ink systems known to the art as lithographic inks and the like.

Other objects and advantages of the present invention will in part become obvious to those well skilled in the art or will in part appear hereinafter.

Broadly, the above-mentioned objects and advantages are realized in accordance with the practice of our invention by a combination of steps in which a furnace carbon black is treated with a selected oxidizing agent and then the oxidized black is subdivided to an especially finely-divided form by a particular attrition process. More specifically, our process involves the steps of first treating a furnace black with an oxidizing agent preferably chosen from the group consisting of nitric acid, nitrogen oxides and ozone to increase the volatile content of said black substantially and then subdividing the so treated black by fluid energy attrition. In accordance with the practice of our invention the resulting product is a furnace black pigment in a fluffy form having excellent flow properties, high tinctorial power and surprisingly easy dispersibility especially in view of the manner and degree of oxidation imparted thereto.

The principles of our invention are applicable to almost any furnace carbon black. However, the best balance of properties in the final pigment—especially the most desirable flow characteristics—are obtained when the practice of our invention is applied to furnace blacks which are frequently characterized by those skilled in the art as "normal and low structure" blacks.

The term "structure" is difficult to define since "structure" is a primary property of black which is not strictly influenced consistently by any property or combination of properties. In general the term is used in the art to designate the degree of aggregation of the primary particles of a black and this property is best observed by electron microscope examination. Since all furnace blacks manifest some degree of aggregation of the primary particles, a particular black is classified as low, normal or high structure depending upon the reative degree of aggregation manifested thereby. The demarcations between the classifications of low, normal and high structure are not well defined. Other properties of a furnace black which are considered by many as indicative of the structure of a black are the conductivity thereof and more especially, the ratio of the oil absorption factor to the average particle diameter. In general, the classification of a black as low, normal, or high structure will vary directly with the value for said ratio. The blacks which we consider especially suitable comprise oil furnace blacks which have a ratio of oil absorption to average electron microscope particle diameter of less than about 6. There are listed in the following table some commercially available blacks of the type which are of particular interest to the present invention: namely, oil furnace blacks having an average electron microscope particle diameter between about 20 and 30 millimicrons, an oil absorption factor between about 50 and 140 pounds of oil per hundred pounds of black and a tinting strength between about 180 and about 240.

TABLE I

| Black | Av. Electron Microscope Part. Diam. (Millimicrons) | Oil Absorp. (lbs. oil/100 lbs. black) | Tinting Strength (Percent of Sterling R*) | Ratio OA/ Part. Diam. |
|---|---|---|---|---|
| Regal 300 | 26 | 90 | 220 | 3.46 |
| Regal 600 | 23 | 80 | | 3.49 |
| Vulcan 3 (HAF) | 29 | 135/125 | 195 | 4.66/4.30 |
| Vulcan 6 (ISAF) | 23 | 125 | 215 | 5.42 |
| Vulcan 9 (SAF) | 20 | 115 | | 5.72 |

*Sterling R is a gas furnace carbon black produced by Cabot Corporation having a nigrometer scale of about 100, a nitrogen surface area of about 23 m.²/gm., an average particle diameter of about 80 millimicrons as determined by electron microscope examination and an oil absorption of about 70 lbs. oil/100 lbs.

It is to be understood however, that those blacks listed above as "Regal" constitute the most preferred embodiment of the present invention. Such furnace blacks as indicated by the ratio of oil absorption to particle diameter have substantially lower than normal structure. These blacks are normally produced in accordance with the teachings set forth in U.S. Patents, 3,010,794 and 3,010,795, both to Friauf and Thorley.

The purpose of the first step of the process of our invention, i.e., the oxidation step, is to impart improved flow characteristics to the furnace blacks of interest. It is well known in the art that in general, the flow characteristics of a carbon black are a direct function of the volatile content. For example, channel blacks inherently manifest excellent long flow characteristics in part because of their high volatile content, e.g., most commercial channel blacks have a volatile content of at least about 5% by weight. Furnace blacks on the other hand rarely manifest such a high volatile content, having in general a percent volatile of about 1% or somewhat less. Accordingly, improved flow are usually imparted to furnace blacks by increasing the volatile content thereof, generally by way of oxidation processes in which the furnace black is reacted with oxidizing agents more active than molecular oxygen.

Although many oxidizing agents can be used to impart improved flow characteristics to furnace blacks, we prefer to react said blacks with nitric acid, nitrogen oxides, or ozone. We especially prefer nitric acid as the reactant because of its relative ease of handling, the economic advantages implicit in its use and more particularly because of the more pronounced effectiveness thereof. More especially, we prefer to treat furnace blacks with an aqueous nitric acid solution. The proportion of solution to black is not especially critical but the amount should be sufficient to achieve good distribution of the components. For example, under usual mixing conditions, the amount of solution should be at least enough to completely wet the black involved. Generally complete wetting of most blacks can be achieved by the use of approximately an equal amount by weight of acid solution and carbon black but oftentimes, amounts somewhat less, say 10 to 30% of solution by weight of the black, are more desirable. Larger amounts of solution, however, complicate to some extent the subsequent drying of the blacks.

The time of contact of the black with the solution is also not especially critical and will depend to a large extent upon the manner in which the solution and black are mixed. We have found that suitable long flow characteristics may be effectively imparted to the blacks of interest by merely mixing same until uniformly wetted with aqueous nitric acid solutions varying in concentration from about 5% to about 70% $HNO_3$ or even higher, using proportions sufficient to provide from about 1% to about 50% or more, preferably from 1.5% to 5%, $HNO_3$ by weight of the black and subsequently heating the so treated black at temperatures between about 150° F. and about 400° F. until dry. A sharp increase (usually at least a 100% increase) in volatile content, e.g., to at least about 1.5% by weight of the black, occurs when the black is thus treated. It is to be understood, however, that useful embodiments of the invention also may add less than 100% volatiles to the surface of the black. In many cases, especially at the higher concentrations and proportions of acid, the volatile content of the black can reach as high as 12% or even higher. While, the drying temperature can vary from about 150° F. to about 400° F., temperatures from about 200° F. to about 350° F. are especially preferred. Such temperatures produce satisfactory volatile contents on the black and do not significantly increase the nitrogen surface area or significantly affect the structure properties of the black.

We have found the optimum conditions of treatment with nitric acid includes heating the black and nitric acid at a temperature of about 250° F. until dry.

Many manners of mixing the nitric acid solution with the black and many types of apparatus capable of doing same are within the scope of the present invention. For example, the acid solution may be used in place of the normal pelletizing liquid or otherwise added to a fluffy black at the time of pelletizing same. Thus, the black may be mixed with the solution in the pelletizing apparatus and thus pelletized and subsequently dried in substantially regular equipment.

Alternative methods of imparting the desired surface characteristics to the blacks of interest involve reacting premoistened or slurried black with nitric acid or nitrogen oxide vapors in suitable concentration and/or proportions at elevated temperatures, e.g., between about 150° F. and about 400° F.

Suitable treatment of the black may also be accomplished by passing unheated mixtures comprising a nitrogen oxide and air over the black while it is slowly rotated in a chamber heated to a temperature above 150° F. and preferably no higher than about 400° F. The black is then subjected to a purge cycle of air in order to remove entrapped or adhering vapors.

The critical surface characteristics for improved flow may also be imparted to furnace blacks by contacting the black with a stream of freshly generated ozone at about room temperature or slightly higher for a length of time sufficient to permit interaction between the ozone and the carbon black. The ozone may be prepared by passing air or oxygen through a high voltage silent discharge or over mercury vapor or by any other suitable method. One convenient set of reaction conditions is obtained by contacting a slowly rotating shallow bed of a few inches depth of the black with a gas which contains from about 1% to about 10% by weight ozone. The total amount of ozone required to treat the black may range from about 1 to about 10 lbs. of ozone/100 lbs. black, but usually amounts of from about 2 lbs. to about 8 lbs. ozone/100 lbs. black are preferred. The time of contact will depend upon the concentrations and proportions of ozone and black, but usually times of from about 2 to about 12 hours are sufficient. The temperature should not normally exceed 300° F. and in many cases need be no higher than ambient temperature.

The second step in our process involves subdividing the oxidized furnace black. The manner of subdividing the black is especially critical since mere reduction of the black to a fine aggregate size does not produce the special advantages and benefits which are obtained in accordance with the practice of our invention. We have found that the required degree of dispersibility of the ultimate pigment can only be realized when the subdivision of the oxidized black is achieved by way of fluid energy attrition processes. For the purposes of the present invention, fluid energy attrition processes include those processes wherein the particles to be subdivided are entrained in a fluid medium and attrition thereof is achieved by way of high energy interparticle collisions. In contrast thereto, other fine grinding attrition processes achieve subdivision by way of grinding for example with metal balls or by high energy collision of the particles with solid objects such as rapidly rotating hammers or blades or the like.

We are unable to explain precisely why fluid energy attrition is so advantageous in producing a surprisingly readily dispersible pigment. However, we have found that fluid energy attrition effects some change in surface chemical groups of the oxidized blacks especially when higher temperatures are involved. We are unaware of the exact mechanism by which said changes occur but we feel that said changes are a significant factor which contributes to the advantages to be obtained by the practice of our invention.

The practice of our invention and the advantages to be obtained therefrom will be better understood and appreciated in view of the following specific examples of particular embodiments of our invention. These examples should be considered as illustrative only and in no sense limitive of the scope of the present invention.

EXAMPLE 1

This example compares the performance of representative furnace black pigments treated in accordance with the practice of our invention with the performance of a commercial channel black ink pigment.

SRM-1656, a low structure SAF oil furnace black, was produced in accordance with the teachings set forth in the aforementioned U.S. patents to Friauf and Thorley. Representative properties of this black include a nigrometer scale of about 79.5, a tinting strength of about 253, an oil absorption factor of about 83 lbs. of oil per 100 lbs. of black and a percent volatile of about 1.3. 250 lbs. of SRM-1656 were well mixed with nitric acid and then rotated at a temperature of 300° F. for 5 hours in a drum dryer at 3 r.p.m. The so treated black had the following properties: a nigrometer scale of 82.3, a tinting strength of about 227, an oil absorption factor of about 64 lbs. of oil per 100 lbs. of black and a percent volatile of 7.2.

Regal 330 is a low structure oil furnace black also produced in accordance with the teachings set forth in the aforementioned U.S. patents to Friauf and Thorley. Representative properties of Regal 330 include a nigrometer scale of about 85.3, a tinting strength of about 239, an oil absorption factor of about 64 lbs. of oil per 100 lbs. of black and a percent volatile of about 0.65. 250 lbs. of Regal 330 were treated with nitric acid in the same manner as was the SRM-1656. The so treated black had the following properties: a nigrometer scale of about 87.8, a tinting strength of about 223, an oil absorption factor of about 61 lbs. of black and a percent volatile of about 3.42.

A twenty-five gram sample of each of the nitric acid treated SRM-1656 and Regal 330 was mixed with a 75 gram sample of a standard litho vehicle. Even after 6 passes through a three roll mill, the jetness and overall dispersion of the resulting pastes were so poor that neither paste would be acceptable as a commercial ink pigment.

However, in accordance with the practice of our invention, samples of the oxidized SRM-1656 and the oxidized Regal 330 were subdivided by the action of a fluid energy mill. The particular fluid energy mill utilized was a 4" Micronizer, compressed air at room temperature being employed as the grinding fluid. (It is pointed out that normally when a Micronizer is utilized the compressed air is preheated to temperatures of about 600° F. or somewhat higher and thus the conditions employed in this experiment are not the most efficient for fluid energy grinding.)

Twenty-five grams of each of the blacks were then mixed with a 75 gram sample of the same litho vehicle utilized above. For comparative purposes a 25 gram sample of Mogul A was also mixed with a 75 gram sample of said litho vehicle. Mogul A is a long flow commercial channel carbon black which is well known to the art and is used quite extensively as an ink pigment especially in litho systems. Each mixture of black and vehicle was given 4 passes on a three roll mill maintained at 85° F. A sample of paste was removed after each pass and said samples were examined for P.C. fineness (a measure of dispersibility), flow and wet masstone. The following data was obtained by averaging a large number of runs; additionally it is pointed out that under the carefully controlled conditions of this example a difference of ¼ in the P.C. fineness test is considered extremely significant.

TABLE II.—P.C. FINENESS

| Black | Passes on Three Roll Mill | P.C. Fineness Guage | |
| --- | --- | --- | --- |
| | | Specs | Scratches |
| Oxidized SRM-1656 | 1 | 8¼ | 9½ |
| | 2 | 8¼ | 9½ |
| | 3 | 8½ | 9½ |
| | 4 | 8¾ | 9¾ |
| Oxidized Regal 330 | 1 | 8½ | 9½ |
| | 2 | 9 | 10 |
| | 3 | 9 | 10 |
| | 4 | 9¼ | 10 |
| Mogul A (control) | 1 | 7¼ | 8½ |
| | 2 | 7½ | 8¾ |
| | 3 | 7¾ | 8¾ |
| | 4 | 8¼ | 9 |

TABLE III.—FLOW

| Black | Flow Rating (4th pass only) 1=best | Remarks |
| --- | --- | --- |
| Oxidized SRM-1656 | 2 | Very long flow. |
| Oxidized Regal 330 | 1 | Do. |
| Mogul A (control) | 3 | Tacky, but long flow. |

TABLE IV.—COLOR (FIRST PASS ONLY)

| Black | Wet Masstone of Gloss Rating (1=Darkest) | Drawdown of Glossy Paper Rating (1=Darkest) |
| --- | --- | --- |
| Oxidized SRM-1656 | 1 | 1 |
| Mongul A (control) | 2 | 2 |

It is obvious from the above data that the oxidized furnace blacks produced in accordance with the practice of our invention are superior in performance to a commercial channel black pigment which has enjoyed and still enjoys significant commercial success as an ink pigment. Table II demonstrates that the blacks produced in accordance with the teachings of our invention are more readily dispersible than the channel black. Thus, the P.C. fineness values of our pigments are surprisingly high even after only one pass through the three roll mill.

Tables III and IV demonstrate that the flow characteristics and color properties of the furnace black pigments produced in accordance with our invention are also generally superior to those of the commercial channel black pigment.

EXAMPLE 2

In this example, a direct comparison is made between our manner of subdividing the oxidized black (fluid energy grinding) and other methods of subdivision, there being set forth the degree of pigment dispersion obtained in each case.

The oxidized SRM–1656 and Regal 330 of Example 1 were subdivided (a) in accordance with the procedure set forth in Example 1 (i.e., by fluid energy) and (b) by means of two other well known attrition devices, namely the Mikropulverizer and Mikroatomizer, both of which are classified in the art as high speed hammer mills. Although both of said hammer mills operate on the same principle, the rotating elements of a Mikroatomizer include not only hammers but also classifying wheels and fans. Both devices are capable of subdividing carbon blacks to an especially fine, generally uniform aggregate size. A more detailed description of all of the aforementioned attrition devices may be found on pages 130–146 of Chemical Engineering News, Dec. 10, 1962.

Twenty-five grams of each of the blacks subjected to the various attrition processes were mixed with a 75 gram sample of a standard litho vehicle. Each mixture was then given 4 passes on a three roll mill maintained at about 85° F. Samples of the paste were removed after each pass and P.C. fineness determined. The following data was obtained:

TABLE V.— OXIDIZED V-1656

|  | Pass 1 | | Pass 2 | | Pass 3 | | Pass 4 | |
|---|---|---|---|---|---|---|---|---|
|  | Specs | Scratches | Specs | Scratches | Specs | Scratches | Specs | Scratches |
| Fluid Energy (Micronizer) | 8¼ | 9½ | 8¼ | 9¼ | 8¼ | 9½ | 8¼ | 9¾ |
| Hammer Mill (Mikropulverizer) | 4½ | 9 | 5 | 8¾ | 5½ | 9 | 5 | 9 |
| Hammer Mill (Mikroatomizer) | 6¼ | 9¼ | 6¾ | 9¼ | 7 | 9¼ | 7 | 9¼ |

TABLE IV.—OXIDIZED REGAL 330

|  | Pass 1 | | Pass 2 | | Pass 3 | | Pass 4 | |
|---|---|---|---|---|---|---|---|---|
|  | Specs | Scratches | Specs | Scratches | Specs | Scratches | Specs | Scratches |
| Fluid Energy (Micronizer) | 8½ | 9¼ | 9 | 10 | 9 | 10 | 9¼ | 10 |
| Hammer Mill (Mikropulverizer) | 5½ | 8¾ | 6½ | 9 | 7 | 9 | 6¾ | 9 |
| Hammer Mill (Mikroatomizer) | 6¾ | 9¼ | 6¾ | 9¼ | 7¼ | 9¼ | 7½ | 9¼ |

It will be obvious from the P.C. fineness values set forth above that the pigments produced in accordance with the practice of our invention are surprisingly dispersible as compared to pigments produced by means of other attrition processes. For example, our pigments manifest an excellent degree of dispersibility even after only one pass through the three roll mill. In contrast thereto, other pigments of approximately the same aggregate size but subdivided by way of other attrition processes manifest a relatively poor degree of dispersibility. Furthermore, it will be noted that the degree of dispersibility of the pigments subdivided by other attrition processes after four passes does not even approach the initial degree of dispersibility of our pigments. The advantages of achieving a high degre of dispersibility after only one pass through a three roll mill will be obvious to those skilled in the art since the overall efficiency of ink producing processes will be greatly benefited.

It is to be understood that although only low structure blacks are involved in the illustrative examples, nevertheless the benefits and advantages which flow from the practice of our invention are applicable to any of the commercial furnace blacks presently available. Also, many modifications in the incidental features utilized to illustrate the practice of our invention can be made without departing from the spirit and scope of the present invention.

Having described our invention in detail together with preferred embodiments thereof, what we declare as novel and desire to secure by U.S. Letters Patent is as follows:

1. A process for producing an improved ink pigment comprising the steps of:
   (a) contacting a normal to low structure furnace carbon black having an electron microscope particle diameter of between 20 and 30 millimicrons, an oil absorption factor between about 50 and about 140 pounds of oil/100 pounds of black, and an oil absorption/average particle diameter ratio of no greater than about 6 with an oxidizing agent more active than molecular oxygen in an amount and for a time sufficient to increase the volatile content of said black by at least 100% by weight over the original value, and
   (b) then passing the so-oxidized black in the dry state through a high energy fluid energy grinding zone to render said furnace black readily dispersible in ink.

2. The process of claim 1 wherein said furnace black is a low structure furnace black having an oil absorption value below 100 pounds oil/100 pounds of carbon black.

3. The process of claim 1 wherein said oxidizing agent is nitric acid.

4. The process of claim 1 wherein said oxidizing agent is a nitrogen oxide.

5. The process of claim 1 wherein said oxidizing agent is ozone.

6. The process of claim 1 wherein the oxidation step is accomplished by uniformly mixing the black with a solution containing from about 5 to about 70% nitric acid by weight, and thereafter drying the resultant mixture at temperatures between about 200° F. to about 350° F.

References Cited

UNITED STATES PATENTS

| 2,682,448 | 6/1954 | Cines | 23—209.1 |
| 2,686,107 | 8/1954 | Jordan | 23—209.1 |
| 3,023,118 | 2/1962 | Donnet | 23—209.1 |
| 3,024,092 | 3/1962 | Gessler | 23—209.2 |
| 3,178,304 | 4/1965 | Eckert et al. | 106—307 |
| 3,245,820 | 4/1966 | Melore et al. | 23—209.2 |
| 3,279,935 | 10/1966 | Daniell et al. | 106—307 |

TOBIAS E. LEVOW, *Primary Examiner.*

S. E. MOTT, *Assistant Examiner.*